United States Patent [19]

Phillips

[11] 4,420,760
[45] Dec. 13, 1983

[54] PRINTER BEAM POSITION FEEDBACK SENSOR

[75] Inventor: Edwin R. Phillips, Rosemont, Pa.

[73] Assignee: Sperry Corporation, New York, N.Y.

[21] Appl. No.: 371,757

[22] Filed: Apr. 26, 1982

[51] Int. Cl.³ .................. G01D 9/42; G01D 15/10
[52] U.S. Cl. ............................ 346/108; 346/76 L
[58] Field of Search .................... 346/76 L, 108

[56] References Cited

U.S. PATENT DOCUMENTS 3,835,249  9/1974  Dattillo et al.
4,019,186  4/1977  Dressen et al. ............... 346/108
4,307,409  12/1981  Greenig et al. ............... 346/108

Primary Examiner—George H. Miller, Jr
Attorney, Agent, or Firm—James R. Bell; Marshall M. Truex

[57] ABSTRACT

A beam feedback synchronization system for optical sweeping systems is disclosed. The system includes a multi-faceted rotating reflection mirror which acts on a collimated light beam such as a laser beam, to cause it to sweep periodically in parallel straight lines across a rotating photoconducting drum. A circular reflector is positioned at a critical position between the rotating reflection mirror and the rotating photoconducting drum. This circular reflector causes a portion of this light to be split off from the main beam and reflected back upon a photodetection device which is positioned in close proximity to the rotating reflection mirror. The electrical signals from the photodetection device are amplified and modified before being applied as periodic synchronizing feedback signals to the character generator from which the data information is emanating.

4 Claims, 4 Drawing Figures

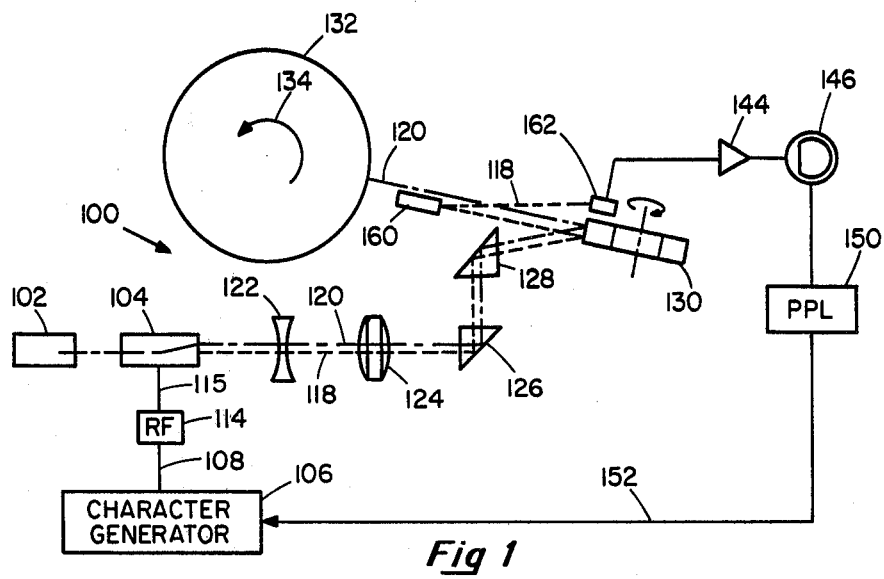
Fig 1
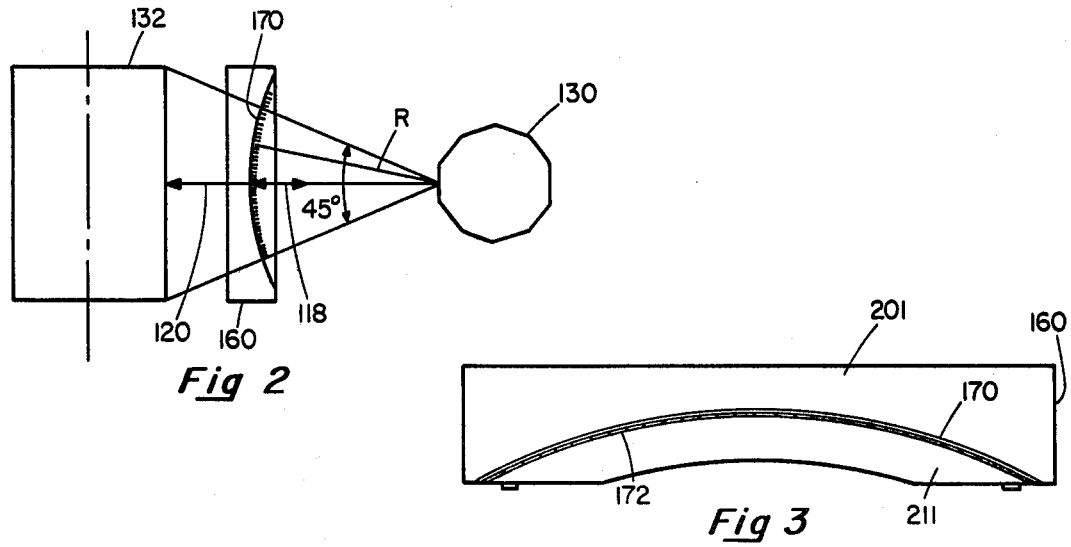
Fig 2
Fig 3
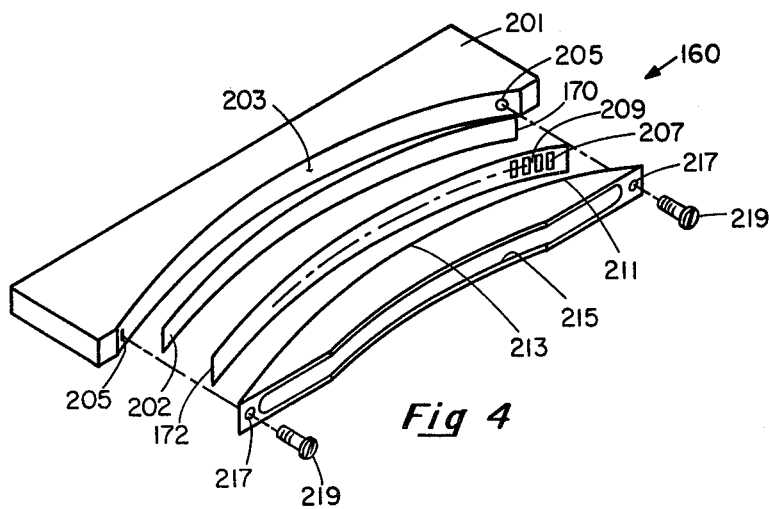
Fig 4

PRINTER BEAM POSITION FEEDBACK SENSOR

BACKGROUND OF THE INVENTION

A. Field of the Invention

The invention relates to optical sweeping systems and more particularly to non-impact printers and facsimile machines of the laser type.

B. Description of the Prior Art

In optical sweeping systems, a collimated light beam, for example, a laser light beam is reflected by a rotating multi-faceted mirror. The rotating mirror causes the reflected light beam to sweep periodically in a fan like fashion across a moving target surface, the end of the beam tracing out a plurality of straight lines thereon. By sweeping, it is meant that the direction of the light beam reflected from a side of the mirror changes over a fixed angle as the mirror rotates until the light beam moves off the side of the mirror onto the next side of the multi-faceted mirror to begin the sweep all over again. The direction of the beam changes at a constant rate, that is, the direction of the beam changes by the same angular amount for a given time interval throughout the entire sweep. Because of this and also because the distance to the straight line path on the target surface from the reflection point on the mirror is greater at the ends of the sweep than at the middle, the end of the reflected beam covers a greater distance along a straight line path, at the ends of the sweep than at the middle during the same time interval. This is often referred to in the art as the tangential velocity of the beam and it varies during the sweep, being a higher velocity at the ends of the sweep and less in the middle.

In laser printers, the light beam is modulated before reflection, in accordance with selected patterns of bit signals which represent alphanumeric characters which are stored in a character generator memory as a matrix of ones and zeros. A character clock signal gates the individual bit signals from the character generator and the bit signals are transmitted to an R.F. signal source, which, for example, transmits R.F. signals when high bit signals (ones) are received and no R.F. signals when low bit signals (zeros) are received. Each sweep of the light beam is modulated in accordance with at least one row of ones and zeros of a plurality of matrices stored in a character generator memory for imaging as a portion of a line of alpha-numeric characters on a photosensitive surface.

The R.F. signals are transmitted to a light beam modulator which is positioned in the path of the collimated light beam and which causes a portion of the light beam to be diffracted through a specific angle (called the Bragg angle) along a deflected path when R.D. signals are present at the modulator. The portion of the beam traveling along the deflected path is called the first order beam while the undeflected beam is called the zero order beam. The zero order beam is always present although with less energy when the first order beam is present.

Together, the first and zero order beams form a modulated light beam.

The modulated light beam then passes through an optical system that controls the focus and size of the beam, and directs the beam to a multifaceted mirror where the beam is swept as described above. As the modulated light beam follows the straight line path on the photosensitive surface during the sweep, the zero order beam is prevented from impinging thereon. When it is desired to image a dot along the straight line path, the first order beam is activated in the above described manner. Otherwise, a space is left on the straight line path. If the character clock signal which gates the individual bit signals from the character generator to thereby activate the first order beam, has a constant frequency, then the separation between adjacent dots and spaces at the ends of the straight line path is greater than at the center. This is so because of the variation in tangential velocity previously described. This variation causes spreading of the subsequently imaged characters located at opposite ends of the straight line path on the photosensitive surface. That is, characters at opposite ends of the path are wider than the same characters at the center. The non-uniformity gives an undesirable appearance and result.

Various approaches have been tried to correct this problem. For example, U.S. Pat. No. 3,835,249, issued to Dattilo et al, discloses a synchronization signal for use with a scanning light beam. It includes means for splitting the main beam, an optical foci, and a light detection device. The split beam is passed through the grating and impinges on the light detection device which is located at the second foci of the optical system. The output signal from the light detection device provides clocking signals for information passing into or out of the light beam. The periodic spacing of the optical grating lines along a straight line provides information with respect to the variation in tangential velocity. A disadvantage of the Dattilo device is its requirement that the fonts used for storing alphanumeric characters be related to the optical line grating since the grating determines the clocking rate. This, of course, reduces its flexibility.

Another prior art system is disclosed in U.S. Pat. No. 4,019,186 issued to Dressen et al. It discloses a light beam motion pick-up device comprising a light transmission rod having a plurality of marks thereon. A portion of the beam is scanned along the rod and whenever it strikes one of the marks, it is scattered and the scattered light travels inside the rod to a photo-electric element which provides timing signals. However, in order to provide a clocking signal for each dot or space forming a character it is necessary to provide a mark for each such dot or space. This could amount to as many as 200 or more marks per inch and is therefore not easily achievable.

A still further prior art system is disclosed in U.S. Pat. No. 4,307,409 issued to Nelson L. Greenig et al on Dec. 22, 1981 and assigned to the assignee of the present invention. Because of this commonality of assignment, the entire content of that patent is considered to be incorporated into this specification by this reference.

U.S. Pat. No. 4,307,409 also disclosed a beam feedback synchronization system for optical sweeping mechanisms. That system includes a multifaceted rotating reflection mirror which acts on a collimated light beam such as a laser beam to cause it to sweep periodically in parallel straight lines across a rotating photoconducting drum. A portion of the light beam is split off and caused to sweep across an equispaced linear array of fiber optic apertures held in place by a fiber optic assembly. The light entering the fiber optic apertures is carried along fiber optic elements to one or more photodetectors which generate periodic electrical signals in response thereto. The frequency of occurrence of the electrical signals from the photodetector is a measure of the velocity of the sweeping light beam across the fiber optic array. A phase locked loop circuit connected to the photodetector(s) provides a character clock signal which is synchronized to the electrical signals received from the photodetector and compensates for variations in the speed of the light beam across the fiber optic array. The phase locked loop further comprises a fast synchronization circuit which provides immediate synchronization between the character clock signal and the first electrical signal occurring at the beginning of a new light beam sweep. In addition, hold circuitry is provided which holds the frequency of the character clock signal coming from the phase locked loop constant during the dead time occurring between laser light beam sweeps.

The foregoing illustrates limitations of the known prior art. Thus, it is apparent that it would be advantageous to provide an alternative directed to overcoming one or more of the limitations as set forth above. Accordingly, a suitable alternative is to provide an improved beam position feedback sensor apparatus and system particularly useful with light beam type printers.

SUMMARY OF THE INVENTION

In one aspect of the present invention this is accomplished by providing a printer beam position feedback sensor including a rotating reflecting means for sweeping a light beam within a planar region at a constant rate. A surface to be swept is disposed to intercept the planar region along a straight line. A circular reflecting means reflects a portion of the light beam to a photodetection means which transmits electrical signals in response to the light beam. Appropriate circuitry provides feedback.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an elevational pictorial block diagram of an embodiment of the beam feedback synchronization system in a laser printer system.

FIG. 2 is a top planar view of the embodiment shown in FIG. 1.

FIG. 3 is a top view of an embodiment of the circular feedback device positioned between the rotating reflector and the rotating photoconducting drum; and FIG. 4 is an isometric view illustrating an embodiment of the circular feedback device of FIG. 3.

DESCRIPTION OF THE PREFERRED EMBODIMENT

FIG. 1 shows a laser printer designated generally 100, a laser light source 102 transmits a collimated light beam to light beam modulator 104. Signals which generate data bits, ones or zeros, from character generator 106 and which represent portions of alphanumeric characters to be printed by the laser printer 100 are sequentially transmitted over line 108 to R.F. generator 114. If a one bit signal is transmitted, R.F. generator 114 transmits an R.F. voltage over line 115 to light modulator 104, otherwise, no R.F. voltage is transmitted. The individual bit signals are gated or clocked from the character generator 106 by a character generator clocking signal.

In the preferred embodiment, the light beam modulator 104 is a piezoelectric crystal device such as a Coherent Radiation Model #305 acousto-optical modulator. In response to R.F. voltage, the light beam mmodulator 104 establishes acoustic vibrations which cause a portion of the input light beam to be diffracted through a specific angle, called the Bragg angle, along a deflected path. The portion of the beam travelling along the deflected path is called the first order beam 120 while the undeflected beam is called the zero order beam 118. Together, the first and zero order beams 120 and 118 form a modulated light beam.

After passing through the light beam modulator 104, the modulated light beam comprising both the zero order beam and first order beam passes through negative lens 122 (Mellos Griot Part no. 01LDK017) and adjustable positive lens 124 (Mellos Griot Part. No. 01LDX149) which together cooperate to control the size and focus of the zero and first order beam. From there, the modulated beam impinges first on prism 126 (Mellos Griot Part No. 01PRS013) which changes the direction of travel of the light beam directing it to prism 128 (Mellos Griot Part. No. 01PRS013) which changes the direction of travel of the light beam a second time. From prism 128, the modulated light beam impinges upon a multi-faceted rotating reflection mirror 130.

Rotating reflection mirror 130 acts on the modulated beam reflecting it toward photoconductive drum 132 while at the same time causing it to sweep repeatedly in fan-like fashion within a planar region. In the preferred embodiment, only first order beam 120 is enabled to impinge upon the surface of photo-conducting drum 132. Hence, when ones stored in the character generator memory are transmitted as high bit signals to R.F. generator 114 which causes R.F. pulses to be transmitted to light beam modulator 104 which in turn causes first order beam 120 to be switched on, then light impinges on photoconducting drum 132 is caused to rotate in the direction of curved line and arrow 134 while the periodically sweeping laser beam traverses a series of parallel straight lines across the surface of the drum. The straight lines are parallel to the axis of the drum.

Rotating mirror 130 is a highly polished multi-faceted mirror having 12 sides in the preferred embodiment and rotating at a speed of about 1575 revolutions per minute. A 12 sided mirror is capable of providing a 60 degree angle sweep, but, in the preferred embodiment, only 45 degree or 75% of the sweep is utilized leaving about 25% of the sweep unused. (See FIG. 2). The time between each used portion of the sweep is known as the dead time. With this mirror speed, adjacent straight lines traversed on photoconducting drum 132 are designed to be approximately 10 mils apart. Since the first order light beam is caused to switch on and off at an R.F. frequency of many megacycles (40 MHz in the preferred embodiment), each straight line path is comprised of many possible dot spaces (approximately 1,200 in a 10 inch straight line segment). When the first order beam strikes the drum, a dark dot will be recorded on the final output of the printer. When the beam is not present, a white space is left. In this way, alphanumeric characters are printed as a series of dots and no dots in accordance with data bits stored in the character generator.

The zero order beam 118 scans through the scanning mirror (the same mirror used by the laser data beam 102) and reflects from a circular reflector 160 containing a grid on a reflective surface (shown in detail in FIGS. 3 and 4). The reflective surface is circular so as to focus the reflected light beam 118 back to a photoreceiver 162.

This photoreceiver or sensor 162 converts the light beams received to low level electrical signals. The electrical signals are suitably amplified by differential amplifier 144 and digitized by digitizer circuitry 146 (Signetics amplifier 529). Before entering amplifier 144, the electrical signals are typically small current pulses which exit from differential amplifier 144 as a series of approximately 1 volt, low voltage signals whose amplitudes are not uniform. Digitizing circuitry 146 operates on the signals to provide uniform 5 volt pulses of uniform duration suitable for operation with conventional TTL digital circuitry. The operation of digitizer 146 is well known and will not be described herein.

The resultant modified electrical signals, called light pulses digitized signals enter beam feedback circuitry designated generally 150 which provides a variable clock signal over line 152 to character generator 106.

As rotating mirror 130 rotates, it changes the direction of travel of the reflected light beam over a 60 degree angle at a constant rate. However, as the first order beam impinges upon a target surface along a straight line path, the velocity of travel of the first order beam 129 along the straight line path (tangential velocity) is not constant. As a result, the speed with which the first order beam 120 moves along the straight line on the target surface is faster at either end of the sweep and slowest in the middle. Hence, as described earlier adjacent dot spaces are further apart at the ends than in the middle and this causes printed characters to spread out at the ends of a line of print. This is undesirable since it is required that all dot spaces be separated by a uniform amount. This is particularly important when graphic forms are overlayed on the printed data so that the data appears in the proper place on the form. In the preferred embodiment, where the minimum distance between the target surface and rotating mirror is 12.3" and a line of sweep is 10" wide, the error in locating a dot at either end of a line of sweep can be as much as 300 mils. It is desirable to keep the error to a fraction of a dot diameter which error in the preferred embodiment is 7 mils or less where the dot diameter is 14 mils.

One manner of correcting the tangential velocity error is to provide character generator clocking signals which speed up at either end of a line of sweep and slow down as the sweep approaches the center as a function of the tangential velocity of the light beam sweep. The information necessary to accomplish this in the preferred embodiment is through the use of the grid member 172 on the circular reflective member 170 of reflector 160 which feeds back the location of the zero order beam 118 to the character generator 106.

Since the zero order beam 118 is caused to sweep at the same time as the first order beam 120 by the rotating mirror 130, and since they are both part of the same beam the tangential velocity of the zero order beam across the circular reflection 160 is the same as the tangential velocity of the first order beam along a straight line path on photoconducting drum 132.

Velocity errors due to fluctuations in the rotating mirror speed and geometrical imperfections in the mirror surfaces are also compensated for with the arrangement of this invention.

FIG. 2 illustrates a top planar view of the photoconductor drum 132 with the circular reflector 160 positioned between the rotating mirror 130 and the drum 132. It is positioned such that the radius R of the reflective mirror 170 of the reflector 160 is equal to the radius of a circle drawn using a surface of the rotating mirror 130 as the center with the circle surface passing through the reflective member 170 of the reflector 160. This is more clearly shown on the FIG. 2.

FIGS. 3 and 4 illustrate circular reflector 160 comprising a base member 201 formed of aluminum having a milled circular surface 203 including threaded apertures 205. Reflective member 170 is preferably a commonly available flexible strip of stainless steel shim stock having a brush finished surface 202. Grid member 172 is also commonly available and is a flexible strip of copper having a plurality of etched slots 207 formed therein for exposing reflective member 170 therethrough. Slots 207 preferably are of the same width as a plurality of strips 209 formed therebetween. A copper oxide apparently forms to give grid member 172 a darkened appearance. A cap member 211 is also of aluminum and includes a circular surface 213 conforming to surface 203. A slot 215 formed in cap 211 permits grid member 172 to be exposed. Apertures 217 receive common screws 219. Reflective member 170 and grid member 172 are sandwiched between surfaces 203, 213 and cap member 211 is secured to base member 201 by screws 219. The combination of strips 209 and slots 207 create an alternating grid pattern exposing strips of the surface 202 of member 170 via slot 215.

The reflective surface 202 of member 170 is not a true mirror-like surface. Surface 202 is finished with a technique that produces imperfections larger than the wave length of the laser radiation. Optical mirror surfaces require imperfection much smaller than the wave length of the light to be reflected. If desired, this reasonably coarse reflecting surface can be achieved by using fine emery paper as the last finishing operation. Optical mirror surfaces require many lapping operations with sequential reductions in the lapping grit before a good mirror is produced.

This coarse mirror surface will still reflect laser light more or less as a true mirror wherein the angle of incidence equals the angle of reflection. However, only some of the reflected rays will obey this rule. Most of the rays will deviate such that a diverging beam will be reflected with only its center ray being reflected at the proper angle.

This diverging beam allows a signficant amount of light to be reflected to photoreceiver 162 even if significant error in mirror contour or position is present.

If this coarse mirror surface is plated with gold or other good mirror coatings, nearly all the incident light will be reflected and little will be absorbed by the reflecting surface. This approach will provide a diffused reflected beam with the highest possible intensity. However, cost of such a coating would be prohibitive and a desirable surface can be achieved in the absence of such a coating.

It is important to note here that the synchronization circuit of the previously mentioned U.S. Pat. No. 4,307,409 and best illustrated in FIGS. 6–10 of that patent may also be used in conjunction with this feedback system.

Thus, it is to be understood that the description set forth in the specification of U.S. Pat. No. 4,307,409 issued to Nelson L. Greenig et al on Dec. 22, 1981 and assigned to the same assignee as the present invention, should be fully incorporated herein by this reference. Particularly important to this description are the FIGS. 6, 7, 8, 9 and 10 and the explanation of those figures given at columns 9, 10, 11, 12, 13, 14 and 15 of that patent.

What has been shown and described herein is a beam feedback approach for a laser printer using a beam position feedback sensor to cancel the effect of errors in beam position due to system tolerances and geometry. It therefore provides a high level feedback signal without requiring optical quality tolerances or adjustment, since it uses scattered light to trigger the sensor.

Because of these lower optical requirements, it is low cost. Further, it requires few of the tight adjustment procedures of current approaches.

The present invention is adapted to operate not only with printers and recording systems as described in FIG. 1 but is also equally adapted to operate with flying spot scanning document readers. For example, in such a reader a laser light beam is caused to sweep across a target surface and be reflected therefrom. As the laser light beam scans the alphanumeric characters on a line of scan on the target surface it is modulated and reflected to a demodulator which takes the information from a modulated light beam and stores it for further processing. In such a system the demodulation of the light beam and subsequent storage takes place under the control of a clocking signal. The same tangential velocity errors are present in such a system as for the laser printer in FIG. 1.

The foregoing has described an improved beam feedback, synchronization system for an optical sweeping apparatus particularly useful with light beam type printers.

It is anticipated that aspects of the present invention, other than those specifically defined in the appended claims, can be obtained from the foregoing description and the drawings.

Having thus described the invention, what is claimed is:

1. A printer beam position feedback sensor apparatus for use in laser printers said printers having a light source for transmitting a collimated light beam along a first path, a character generator and a light beam modulator connected thereto, said light beam modulator responsive to modulation signals from said character generator to modulate said light beam, said apparatus comprising:
   rotating reflection means disposed within said first path for sweeping said light beam incident thereon at a constant rate within a planar region;
   a surface to be swept, said surface disposed to intercept said planar region along a straight line;
   a circular reflecting and beam splitting means disposed between said rotating reflection means and said surface and disposed at least partially within said planar region for reflecting at least a portion of said beam along a synchronization path, said circular reflecting beam splitting means including a base member having a first circular surface, a reflective member adjacent said first circular surface, means for forming a grid pattern with said reflective member, said grid forming means including a grid member adjacent said reflective member having a plurality of slots formed therein, and means for retaining and exposing said reflective and grid members including a cap member having a second circular surface urged toward said first circular surface by a fastening member, said reflective and grid members being retained between said first and second circular surfaces, said cap member having a slot formed therethrough for exposing said reflective and grid members
   a photodetector means dispatch to receive light signals from said circular reflecting and beam splitting means and to transmit electrical signals in response to said received light signals; and
   circuitry means connected between said photodetector means and the character generator to provide amplified feedback synchronization signals to said character generator upon receipt of electrical signals from said photodetector means.

2. The apparatus as set forth in claim 1 wherein said circular reflecting means has a brush finished surface.

3. A printer beam position feedback sensor system comprising:
   a light source for transmitting a collimated light beam along a first path;
   a rotating reflection means disposed within said first path for periodically sweeping said light beam incident thereon within a planar region at a constant rate;
   a surface to be swept, said surface disposed to intercept said planar region along a straight line;
   a circular reflecting means located between said rotating reflection means and said surface to be swept for reflecting a portion of said light beam, said circular reflecting means including a base member having a first circular surface, a reflective member adjacent said first circular surface, means for forming a grid pattern with said reflective member, said grid forming means including a grid member adjacent said reflective member having a plurality of slots formed therein, and means for retaining and exposing said reflective and grid members including a cap member having a second circular surface urged toward said first circular surface by a fastening member, said reflective and grid members being retained between said first and second circular surfaces, said cap member having a slot formed therethrough for exposing said reflective and grid members;
   photodetection means disposed in close proximity to said rotating reflection means, with said circular reflecting means positioned for reflecting said portion of said light beam to said photodetection means, said photodetection means operable for transmitting electrical signals in response to the receipt of said portion of the light beam; and
   circuitry means connected to said photodetector for providing a variable clock signal synchronized to said electrical signals from said photodetector.

4. The system as set forth in claim 3 wherein said circular reflecting means has a brush finished surface.

* * * * *